(12) United States Patent
Bosco et al.

(10) Patent No.: US 12,436,891 B1
(45) Date of Patent: Oct. 7, 2025

(54) ALLOCATION OF STORE BUFFER ENTRIES

(71) Applicant: Arm Limited, Cambridge (GB)

(72) Inventors: Ilaria Bosco, Nice (FR); Yohan Fernand Fargeix, Nice (FR); Geoffray Matthieu Lacourba, Nice (FR); Paolo Monti, Quattordio (IT); Luca Nassi, Antibes (FR); Albin Pierrick Tonnerre, Nice (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/753,357

(22) Filed: Jun. 25, 2024

(51) Int. Cl.
*G06F 12/08* (2016.01)
*G06F 12/0871* (2016.01)
*G06F 12/0875* (2016.01)
*G06F 13/16* (2006.01)

(52) U.S. Cl.
CPC ...... *G06F 12/0871* (2013.01); *G06F 12/0875* (2013.01); *G06F 13/1673* (2013.01)

(58) Field of Classification Search
CPC .......... G06F 12/0871; G06F 12/0875
See application file for complete search history.

(56) References Cited

U.S. PATENT DOCUMENTS

2020/0379927 A1* 12/2020 Chan ............... G06F 12/0875

* cited by examiner

*Primary Examiner* — Jae U Yu
(74) *Attorney, Agent, or Firm* — NIXON & VANDERHYE P.C.

(57) ABSTRACT

Apparatuses, systems, methods, computer-readable media, and computer code are disclosed. An apparatus comprises allocation circuitry configured to allocate store data comprising N portions in a store buffer. The store buffer comprises a data buffer configured to hold data entries, each data entry configured to hold one of the N portions of the store data; and an address buffer configured to hold address entries, wherein a given address entry is indicative of a memory address at which the store data is to be stored and is associated with N indications identifying one or more of the data entries that contain the store data. The allocation circuitry is responsive to a determination that M portions of the N portions of the store data each comprise duplicate data to set M indications of the N indications to identify a given data entry holding the duplicate data.

15 Claims, 11 Drawing Sheets

ALLOCATION OF STORE BUFFER ENTRIES

TECHNICAL FIELD

The present disclosure relates to data processing. In particular, the present disclosure relates to managing the allocation of entries in a store buffer.

DESCRIPTION

A data processing apparatus may perform operations to cause data to be stored to a memory system. The process of storing data may take some time to complete, so to allow the data processing apparatus to continue performing further operations, a store buffer may be implemented in which data is temporarily held before being passed to the memory system for storage. The available capacity of the store buffer therefore affects the rate at which store operations can be performed because store operations may be required to stall if the store buffer is already full of data that has yet to be stored to the memory system.

SUMMARY

In one example embodiment described herein there is provided an apparatus comprising: allocation circuitry configured to allocate store data in a store buffer, the store data comprising N portions, where N>1; the store buffer comprising: a data buffer configured to hold data entries, each data entry configured to hold one of the N portions of the store data; an address buffer configured to hold address entries, wherein a given address entry is indicative of a memory address at which the store data is to be stored and is associated with N indications identifying one or more of the data entries that contain the store data; wherein the allocation circuitry is responsive to a determination that M portions of the N portions of the store data each comprise duplicate data to set M indications of the N indications to identify a given data entry holding the duplicate data.

In another example embodiment described herein there is provided a system comprising: an apparatus as described above implemented in at least one packaged chip; at least one system component; and a board, wherein the at least one packaged chip and the at least one system component are assembled on the board.

In another example embodiment described herein there is provided a chip-containing product comprising the system described above, wherein the system is assembled on a further board with at least one other product component.

In another example embodiment described herein there is provided a method comprising: allocating store data in a store buffer, the store data comprising N portions, where N>1; holding data entries, each data entry configured to hold one of the N portions of the store data; holding address entries, wherein a given address entry is indicative of a memory address at which the store data is to be stored and is associated with N indications identifying one or more of the data entries that contain the store data; setting, in response to a determination that M portions of the N portions of the store data each comprise duplicate data, M indications of the N indications to identify a given data entry holding the duplicate data.

In another example embodiment described herein there is provided a non-transitory computer-readable medium storing computer-readable code for fabrication of an apparatus comprising: allocation circuitry configured to allocate store data in a store buffer, the store data comprising N portions, where N>1; the store buffer comprising: a data buffer configured to hold data entries, each data entry configured to hold one of the N portions of the store data; an address buffer configured to hold address entries, wherein a given address entry is indicative of a memory address at which the store data is to be stored and is associated with N indications identifying one or more of the data entries that contain the store data; wherein the allocation circuitry is responsive to a determination that M portions of the N portions of the store data each comprise duplicate data to set M indications of the N indications to identify a given data entry holding the duplicate data.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
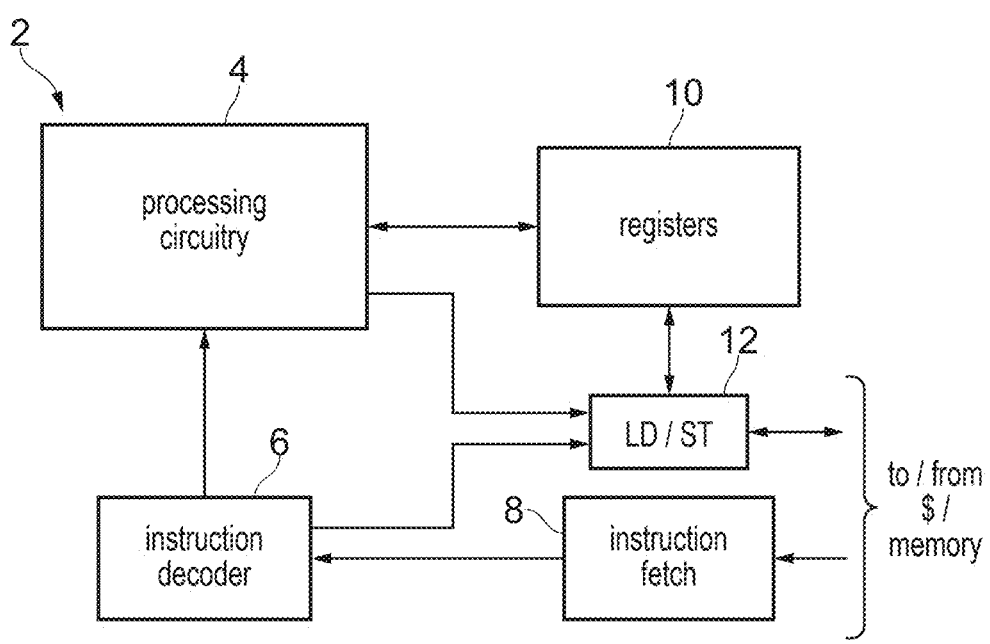
FIG. 1 schematically illustrates a data processing system comprising an apparatus according to some example embodiments.

Before discussing the embodiments with reference to the accompanying figures, the following description of embodiments is provided.

In accordance with one example configuration there is provided an apparatus comprising allocation circuitry configured to allocate store data in a store buffer, where the store buffer comprises a data buffer and an address buffer. The data buffer is configured to hold data entries, each data entry configured to hold a portion of the store data. In some examples, the store data is split N times to form N equally sized portions. For example, when the store data contains 2 portions, the store data can be held by 2 data entries. The address buffer contains address entries each indicative of a memory address at which the store data is to be stored. For example, the memory address may be specified by a store instruction executed by data processing circuitry. In examples where the store data is stored over a range of memory addresses, the memory address indicated by an address entry may define a start address or an end address of that range of memory addresses. It will be appreciated therefore that a given address entry may correspond with the store data held by up to N data entries. To track this correspondence, a given address entry is associated with a set of N indications identifying one or more data entries that contain the store data.

When the store buffer is being intensively used, for example due to a high frequency of store operations being performed, it is possible for the data buffer to be filled with portions of store data while the address buffer still has capacity available. Accordingly, the capacity of the data buffer presents a bottleneck that obstructs more store data from being allocated. One approach to remove this bottleneck is simply to increase the size of the data buffer, e.g. by N times, such that the data buffer and the address buffer are filled proportionally. However, such an approach increases the power consumption and required circuit area.

In accordance with the present techniques, the allocation circuitry is responsive to a determination that multiple (M) portions of the N portions of the store data contain duplicate data to set M indications to identify a given data entry (i.e. one data entry) that holds the duplicate data. Using the example where the store data comprises 2 portions as above (i.e. N=2), if both portions are identical (i.e. M=2), a given data entry holding a portion is identified by both indications associated with the given address entry. Accordingly, both portions of the store data can be represented in the data buffer using one entry instead of two entries, thus effectively increasing the capacity of the data buffer by one without needing to incur the hardware cost of implementing a higher capacity buffer.

It will be appreciated that the examples of N and M given above are only examples and they may take any value such that 1<M≤N. Indeed, higher values of N and M results in a greater effective increase in the capacity of the data buffer because a larger number of portions can be represented by the given data entry. For example, where N=M=8, all 8 portions can be represented by one data entry, thereby effectively increasing the capacity of the data buffer by 7 entries.

Since the portions of duplicate data can all be represented by a single data entry, there is no need to hold all N portions in individual data entries. Accordingly, in some examples, the allocation circuitry is configured to prevent a data entry other than the given data entry from holding the duplicate data. Therefore, the data buffer only stores one instance of the duplicate data so that the remaining capacity of the data buffer can be used for the store data of other store operations.

The presence of M duplicate portions may be determined in various different ways. In some examples, a predetermined type of data processing instruction is expected to cause store operations that specify store data with duplicate portions. Therefore, the apparatus may comprise determination circuitry to determine that M portions comprise duplicate data in response to detecting that the store data is specified by the predetermined type of instruction. The determination circuitry may detect the data processing instruction by receiving a signal from instruction decoding circuitry in a data processing apparatus.

In some examples, the predetermined type of data processing instruction is a memory-set instruction, which causes a specified block of memory to be set to a repeating set value or pattern of values. Accordingly, the store data would contain duplicate data in the form of that repeating set value or pattern of values. Some variants of a memory-set instruction may exist depending on the instruction set architecture supported by the apparatus, including prologue, main and epilogue variants that are expected to be executed in succession. A prologue memory-set instruction causes operations to be performed to set an initial block of memory to the set value up to an alignment boundary in memory. The main memory-set instruction then causes operations to be performed to set intermediate blocks of memory to the set value, repeating as many times as necessary. The epilogue memory-set instruction then causes operations to be performed to set a final block of memory to the set value, thus completing the memory-set. In such examples, any one or more of the prologue, main or epilogue instructions may be considered the predetermined type of instruction according to the present techniques.

A more opportunistic approach of detecting the M duplicate portions is by comparing each of the N portions to each other prior to allocation to the store buffer. Therefore, some examples of the apparatus may comprise comparison circuitry configured to compare two or more of the N portions prior to allocation and to identify whether the M portions contain the duplicate data. Accordingly, the M portions can be identified as containing duplicate data independently of any type of instruction. It will be appreciated that some examples may include either the comparison circuitry or the determination circuitry described previously, whereas other examples may include both.

In some examples, store operations may specify store data in predefined units that a memory system is configured to handle. In particular, memory systems that implement one or more data caches may handle the movement of data between caches and main memory in units of cache lines. It will be appreciated that the amount of data contained in a cache line will vary between implementations. The N portions, and by extension the data entries in the data buffer, then correspond to a fixed amount of a cache line.

In specific examples, the N portions correspond to 1/N of a cache line. Using the above example where N=2, the data entries in the data buffer would therefore be configured to hold half of a cache line.

In some examples, the store buffer may support store buffer merging, such that the store data specified by an older store operation is overwritten (partially or wholly) by the store data specified by a younger store operation. This makes it possible to update the memory system correctly with fewer accesses. It will be appreciated that for merging to occur, it is preferred that the N portions are held by separate data entries, instead of being represented by a single data entry in accordance with the present techniques. In particular, this is so that the store buffer can identify which portions of older store data is to be overwritten by portions of newer store data. If M portions were to be represented by a single entry as described above, then the individual portions may not be able to be separated and overwritten for the purposes of merging. To solve this problem, the apparatus in such examples is provided with merging circuitry configured to identify whether the M portions can be merged with further store data (e.g. store data that is already present in the data buffer). In response to identifying that the M portions can be merged, the merging circuitry is configured to cause the allocation circuitry to set the M indications to identify different data entries, with each one of those data entries storing one of the M portions. In such examples, the merging circuitry is capable of overriding the allocation circuitry to disable the optimisation provided by the present techniques in favour of facilitating store buffer merging.

For the above purposes, the merging circuitry may therefore monitor the address entries being allocated to the address buffer to detect when two address entries are indicative of the same memory address.

In some examples, the store buffer may support store-to-load forwarding, such that the store buffer can return the store data in response to a load operation specifying a memory address indicated in one of the address entries. In particular, since the most up-to-date data would then be in the store buffer due to the store operation that precedes the load operation, it is more efficient to retrieve the store data from the store buffer instead of waiting for the store buffer to write the data to memory before re-fetching that data from memory. Accordingly, the apparatus may be provided with forwarding circuitry configured to retrieve the store data based on the N indications associated with the given address entry in response to a load operation specifying the same memory address. Since the present techniques still provide N indications, the forwarding circuitry can re-construct the store data by replicating the duplicate data M times to reconstruct all N portions of the store data.

In accordance with another example configuration there is provided a method comprising: allocating store data in a store buffer, the store data comprising N portions, where N>1; holding data entries, each data entry configured to hold one of the N portions of the store data; holding address entries, wherein a given address entry is indicative of a memory address at which the store data is to be stored and is associated with N indications identifying one or more of the data entries that contain the store data; setting, in response to a determination that M portions of the N portions of the store data each comprise duplicate data, M indications of the N indications to identify a given data entry holding the duplicate data.

In accordance with another example configuration there is provided a non-transitory computer-readable medium storing computer-readable code for fabrication of an apparatus comprising: allocation circuitry configured to allocate store data in a store buffer, the store data comprising N portions, where N>1; the store buffer comprising: a data buffer configured to hold data entries, each data entry configured to hold one of the N portions of the store data; an address buffer configured to hold address entries, wherein a given address entry is indicative of a memory address at which the store data is to be stored and is associated with N indications identifying one or more of the data entries that contain the store data; wherein the allocation circuitry is responsive to a determination that M portions of the N portions of the store data each comprise duplicate data to set M indications of the N indications to identify a given data entry holding the duplicate data.

Particular embodiments will now be described with reference to the figures.

FIG. 1 schematically illustrates an example of a data processing apparatus 2 (for example a CPU or GPU) which comprises processing circuitry 4 for performing data processing operations in response to instructions decoded by an instruction decoder 6. The instructions decoded by the instruction decoder 6 are fetched from a cache or memory by instruction fetch circuitry 8.

Based on the decoded instructions, the instruction decoder 6 generates control signals to control the processing circuitry 4 to perform data processing operations represented by the instructions. Operands for the data processing operations are obtained from registers (selected as source registers), in a register file 10 comprising a certain number of registers. Results of the operations are written back to registers 10 (selected as destination registers) by the processing circuitry 4. For load/store instructions requesting that data from the cache or memory is loaded to the registers 10 or that data in the registers 10 is stored to the cache or memory, a load/store unit 12 may be instructed to carry out the load/store operation. When carrying out the store operation, the load/store unit 12 may receive from the registers 10 store data and a memory address at which the store data is to be stored in memory. It will be appreciated that FIG. 1 is a simplified example of a CPU or GPU 2 and that the CPU or GPU may include many other elements not shown in FIG. 1 for conciseness.

Figure 2:
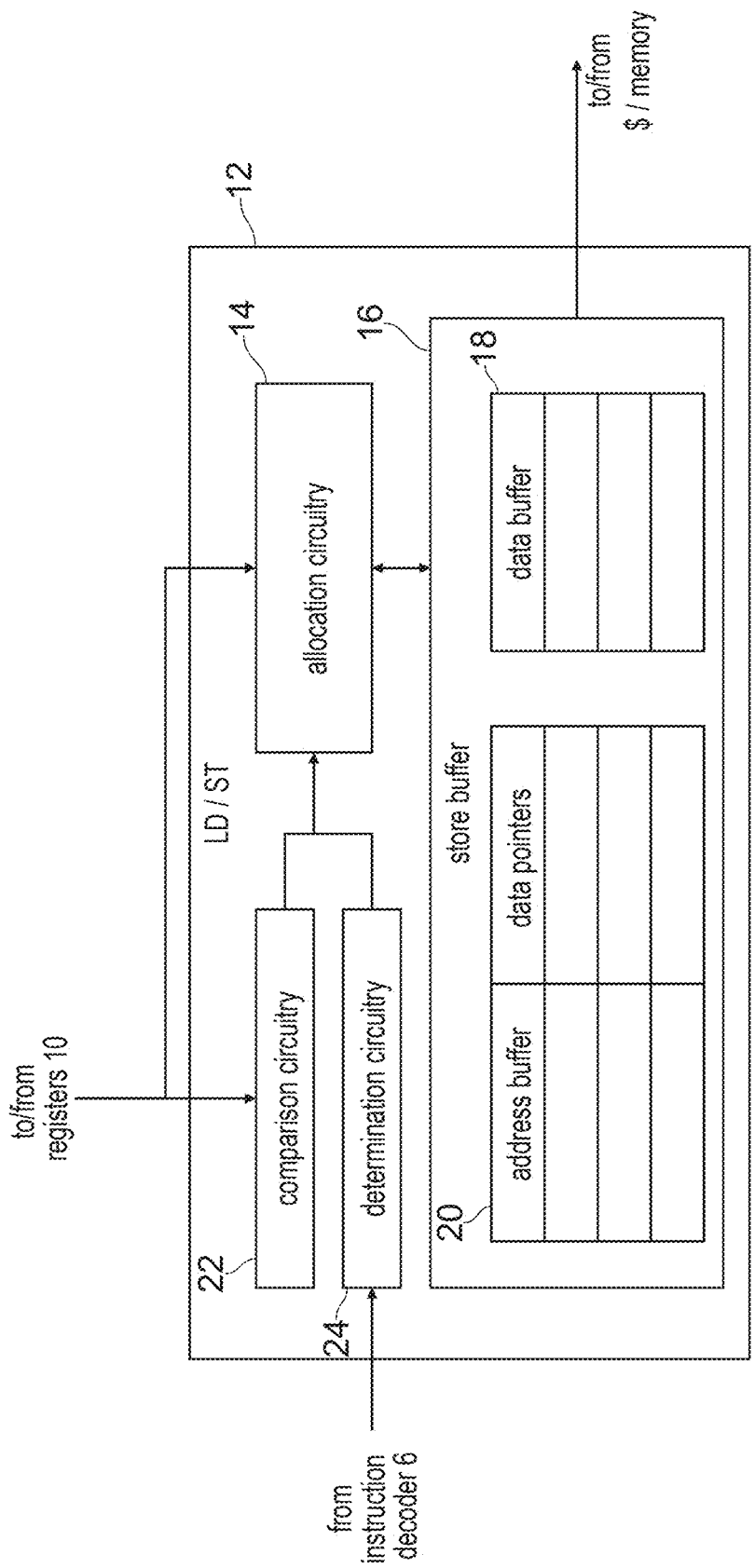
FIG. 2 schematically illustrates a load/store unit according to some example embodiments.

The load/store unit 12 corresponds to an example of the apparatus defined in the appended claims. FIG. 2 illustrates an example of a load/store unit 12 in more detail. In particular, the load/store unit 12 comprises allocation circuitry 14 for allocating store data received from the registers 10 in a store buffer 16. The store buffer 16 comprises a data buffer 18 configured to hold a plurality of data entries for temporarily holding a portion of the store data. The store data is split into N portions, where the value of N depends on the size of the store data and the capacity of each data entry. For example, if the store data is equivalent to one cache line to be handled by a data cache, e.g. 64 bytes, and each entry of the data buffer is configured to store 32 bytes, then N=2. The store buffer 16 further comprises an address buffer 20 configured to hold the memory address to which the store data is to be written in memory. Each address entry is associated with a set of N data pointers that identify the data entries that contain a portion of the store data. Accordingly, when writing the data to memory, the load/store unit 12 uses the data entries to construct the store data to be communicated to the memory system.

In accordance with the present techniques, the load/store unit 12 comprises comparison circuitry 22 and/or determination circuitry 24 for determining whether any two or more (hereinafter, M) portions of the N portions comprise duplicate (i.e. identical) data. If so, then the allocation circuitry responds by setting corresponding M data pointers to identify the same data entry in the data buffer 18. Accordingly, fewer data entries are required to represent the store data in the data buffer 18. This effect will be exemplified in the following comparative examples.

Figure 3A:
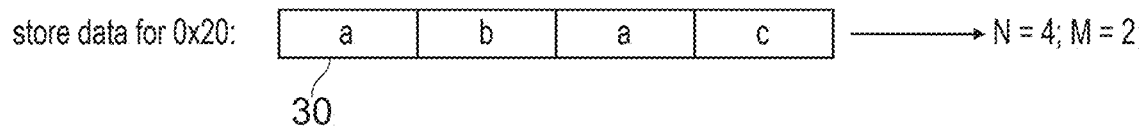
FIGS. 3A to 3C illustrate a comparative example of how indications associated with address entries may be set to identify one or more data entries.

FIG. 3A illustrates an example of store data 30 to be written to the memory address 0x20. The store data 30 may have been generated in the registers 10 by performing one or more data processing operations prior to a store instruction being executed by the processing circuitry 4. In this example, the store data 30 comprises 4 portions (i.e. N=4), respectively specifying the data values, 'a', 'b', 'a' and 'c'. Using the previous example where the store data 30 corresponds to a cache line for a data cache, the store data 30 may have a total size of 32 bytes (i.e. each portion is 8 bytes). The memory address may therefore define a start address of the cache line in memory such that 'a' is written to 0x20, 'b' is written to 0x28, 'a' is written to 0x30 and 'c' is written to 0x38.

Figure 3B:
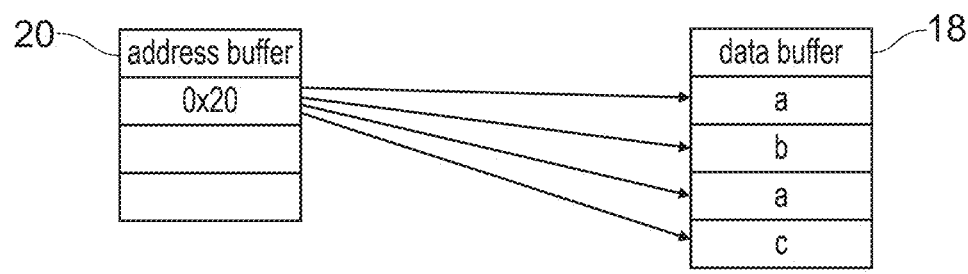

FIG. 3B illustrates one approach for allocating the store data 30 and the memory address to the data buffer 18 and address buffer 20 respectively. The memory address is held by an address entry in the address buffer 20 and each portion of the store data is held in a data entry in the data buffer 18. In this approach, 4 data entries are required to store the store data 30. The arrows represent the data pointers associated with the address entry to identify the data entries that contain the portions of the store data 30 that is to be stored at address 0x20. In the approach of FIG. 3B, it can be seen that each entry in the address buffer 20 corresponds to 4 entries in the data buffer 18, hence when a large amount of data is being stored, e.g. due to frequent execution of store instructions, the data buffer 18 can quickly become full.

Figure 3C:
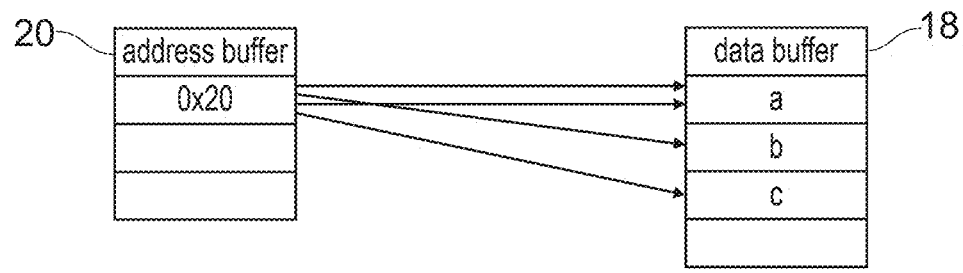

FIG. 3C illustrates the approach according to the present techniques that allow information to be compressed in the data buffer 18, thus increasing the available capacity of the data buffer 18. The allocation circuitry 14 is responsive to a determination identifying that 2 of the portions of the store data 30 specify the data value 'a' (i.e. M=2). This determination may be performed, for example, by the comparison circuitry 22 that receives the store data 30 and compares each of the portions to each other prior to allocation. In this example, the data value 'a' would therefore be identified as duplicate data when the first and third portions are compared by the comparison circuitry 22. The memory address is held by the address entry as described above, but now the allocation circuitry 14 prevents more than one data entry from holding the duplicate data value 'a'. Furthermore, the allocation circuitry 14 sets 2 of the data pointers associated with the address entry to identify the same data entry containing 'a'. Accordingly, when reconstructing the store data 30 for writing to the memory system, the store buffer 16 can refer to the pointers to identify that the data value 'a' is present twice in the store data 30. Using this approach, the 4 portions of the store data 30 in this example can be represented in the data buffer 18 using only 3 entries, thus making an entry available for storing further store data.

It will be appreciated that the values for N and M are not restricted to those used in the example of FIGS. 3A to 3C. Additionally, in some examples there may be multiple different instances of duplicate data, e.g. where store data specifies the data values 'a', 'b', 'a', 'b', and the present techniques can be applied to each instance of duplicate data such that the data buffer 18 has one data entry holding 'a' and one data entry holding 'b', with the data pointers identifying each data entry twice.

Figure 4A:
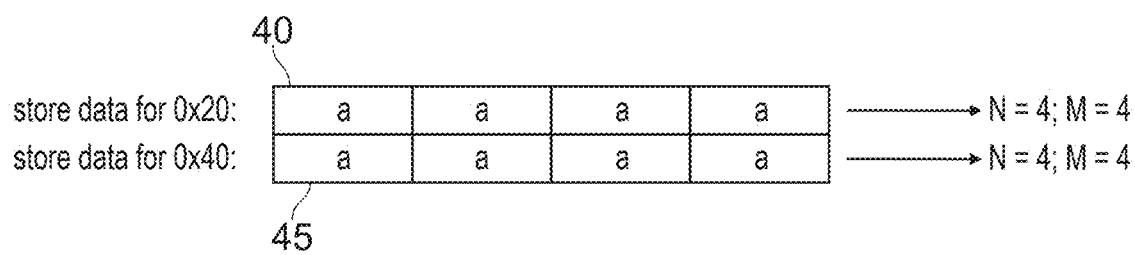
FIGS. 4A to 4C illustrate another comparative example of how indications associated with address entries may be set to identify one or more data entries.

It will also be appreciated that when more portions of the store data contain duplicate data (i.e. as M increases), the amount by which the store data can be compressed in the data buffer 18 is amplified. In some examples, the store data may comprise entirely duplicate data, for example during execution of particular types of instructions, such as memory-set instructions, where multiple store operations are performed across a block of memory to set the block to a repeating data value or repeating pattern of data values. FIG. 4A illustrates such an example, where two store operations are performed in a sequence. The first operation specifies store data 40 to be stored at the memory address 0x20. The second operation specifies store data 45 to be stored at the memory address 0x40. Using the above example where the store data corresponds to a cache line of 32 bytes, these operations therefore define the store data of adjacent cache lines. The store data 40, 45 each comprise 4 portions as in the previous example (i.e. N=4), each portion containing a repeating data value 'a'.

Figure 4B:
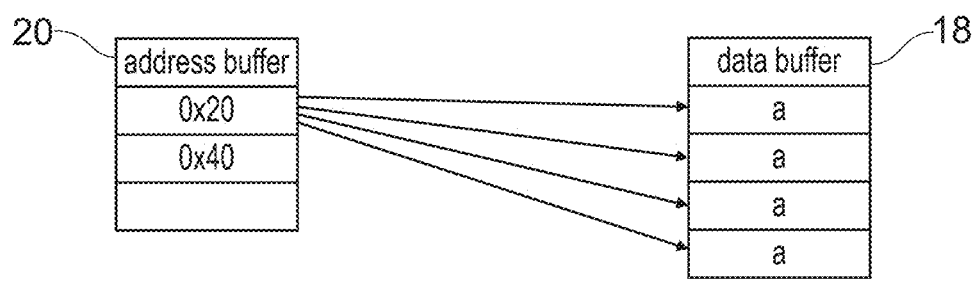

FIG. 4B illustrates an approach where no optimisation is used. The memory address 0x20 is held in the address buffer 20 as described previously and each portion of the store data 40 is held in a data entry of the data buffer 18. The data pointers associated with the address entry 0x20 then indicate each of the 4 data entries containing the store data 40. Since the data buffer 18 is now full, the store data 45 cannot be held in the data buffer 18, thus causing a bottleneck in the store operations.

Figure 4C:
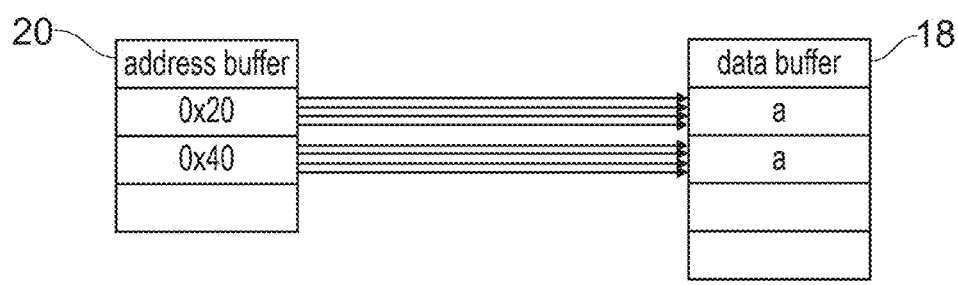

FIG. 4C illustrates the approach according to the present techniques. It can be determined that 4 portions of the store data 40 specify the data value 'a' (i.e. M=4). This may be performed as above using the comparison circuitry 22. Alternatively or additionally, the determination may be performed based on the type of instruction that has specified the store data 40. As mentioned above, a repeating pattern of data values is expected to occur when a memory-set instruction is executed. Therefore, determination circuitry 24 may be provided to receive a signal from the decoder circuitry when the memory-set instruction is first encountered. The determination circuitry 24 then controls the allocation circuitry 14 to allocate the store data 40 to the store buffer 16 with 'a' having been identified as duplicate data without any comparisons between the portions of store data 40 being required. When allocating the store data 40, the allocation circuitry 14 prevents more than one data entry from holding the duplicate data value 'a' as described above and sets all 4 data pointers associated with the memory address 0x20 to point to the same data entry containing 'a'. Accordingly, all 4 portions of the store data 40 can be represented using only one data entry, thus making 3 entries available for holding further store data. The same determination can then be performed for the store data 45, which also contains 4 portions specifying the data value 'a'. Therefore, the same technique is applied for allocating the store data 45 to the store buffer such that all 4 data pointers associated with the memory address 0x40 points to the same data entry containing 'a'.

Figure 5:
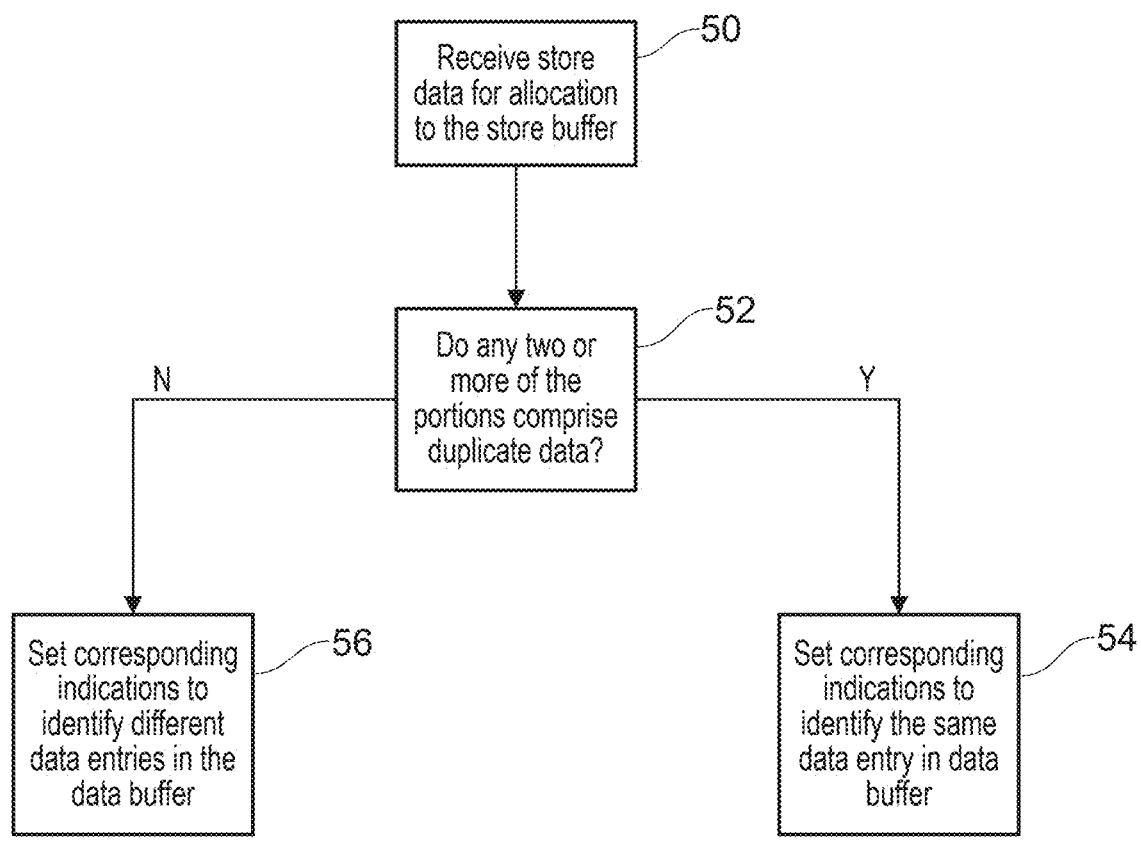
FIG. 5 shows a sequence of steps for determining how to set the indications associated with a given address entry.

FIG. 5 illustrates a sequence of steps that may be performed by the allocation circuitry 14 when allocating store data to the store buffer according to the present techniques. At step 50, store data is received for allocation to the store buffer 16. At step 52, a determination is performed to identify if any two or more of portions of the store data comprise duplicate data. As above, this may be performed for example using the comparison circuitry 22 or determination circuitry 24. If two or more of the portions comprise duplicate data, then at step 54 the allocation circuitry 14 sets a corresponding number of indications to identify the same data entry in the data buffer 18. Therefore, those two or more portions can be represented in the data buffer 18 using only one data entry. If all of the portions of the store data comprise unique data (i.e. no duplicate data), then the corresponding indications are set to identify different entries in the data buffer at step 56.

Figure 6:
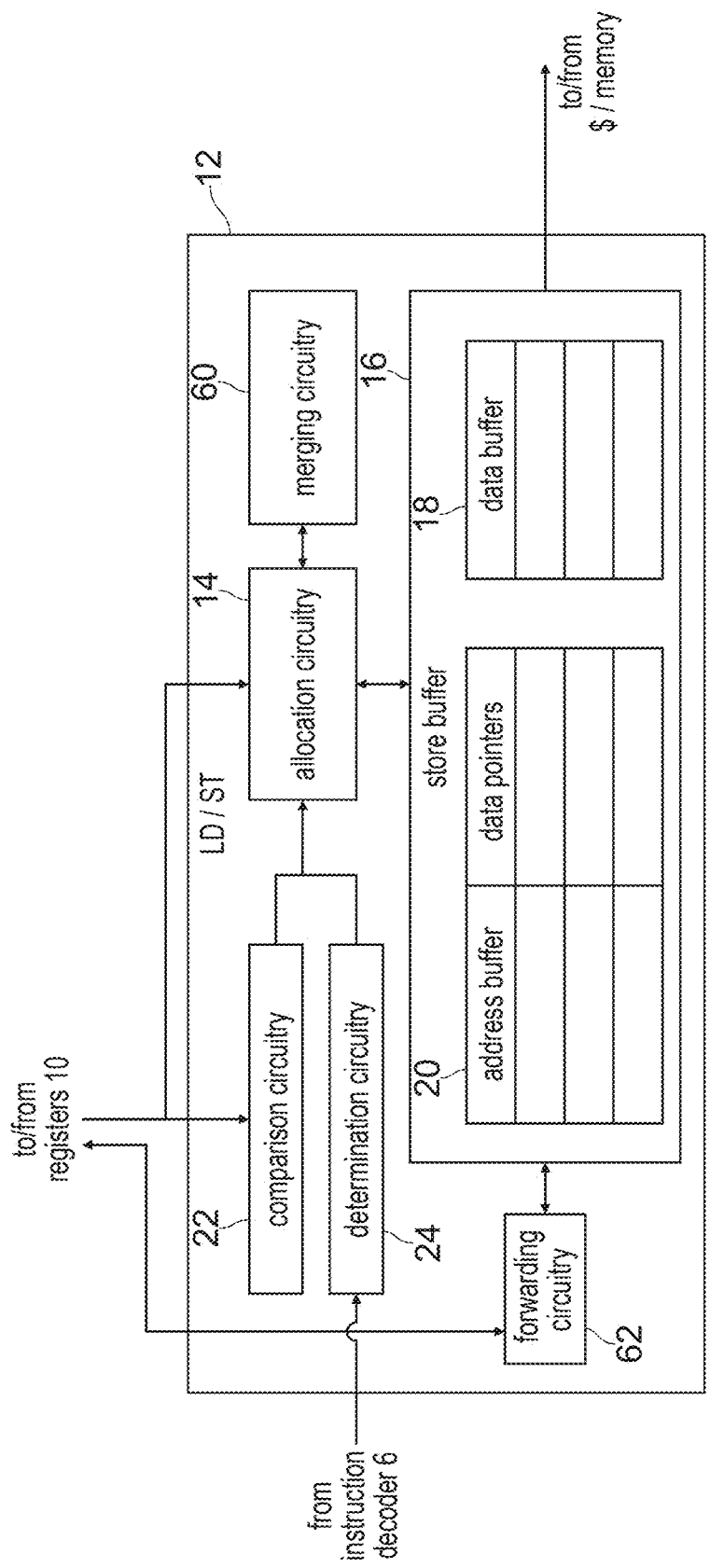
FIG. 6 schematically illustrates a load/store unit according to some example embodiments.

An apparatus incorporating the present techniques may also be combined with other methods of improving the performance of a store buffer 16. FIG. 6 illustrates another example of the load/store unit 12 that may include similar features to the load/store unit 12 of FIG. 2. In this example, the load/store unit 12 further comprises merging circuitry 60 to support store buffer merging. In particular, the merging circuitry 60 is configured to monitor the memory addresses being specified by store operations received by the load/store unit 12 and is responsive to a store operation specifying store data to a memory address that is already pending in the address buffer 20. In such a scenario, the store data can be merged so that the merged data can be written to the memory system in one access instead of writing the first store data and then overwriting it with the second store data.

Figure 7:
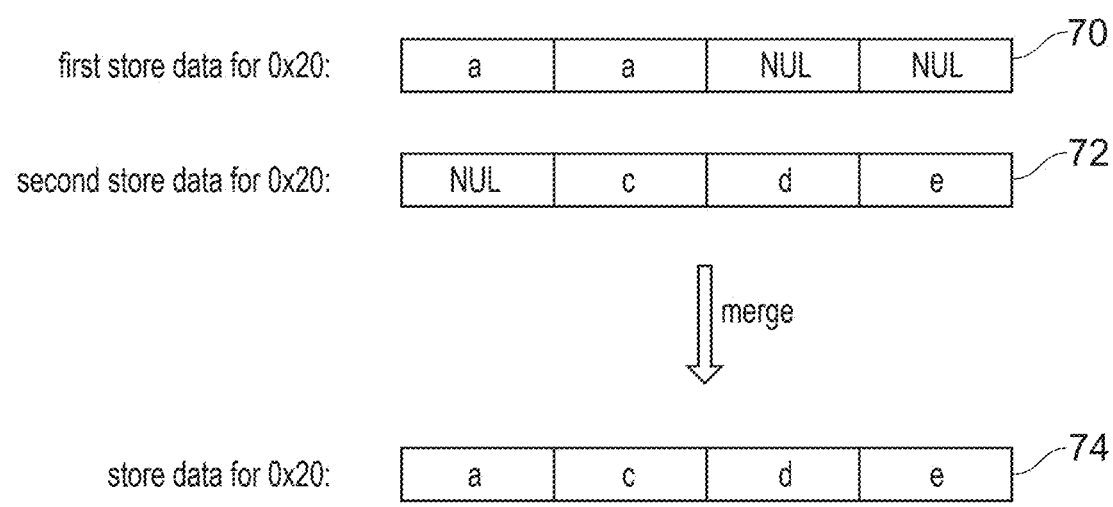
FIG. 7 illustrates how store data may be merged.

FIG. 7 illustrates how store buffer merging can be performed using first store data 70 and second store data 72, both being directed to the same memory address 0x20. The first store data 70 contains 4 portions, where the first two contain duplicate data 'a', and the last two portions are null. Null portions may occur, for example, when the store data 70 corresponds to a cache line, but only part of the cache line is being updated with new data. Accordingly, the store data 70 is padded with null portions so that the store data 70 is still handled in terms of cache lines, despite half of the cache line not containing any new data. The second store data contains a null portion, followed by the data values 'c', 'd' and 'e'. It can be seen therefore that merged store data 74 could be formed by overwriting the portions of the first store data 70 with the corresponding portions of the second store data 72. In particular, writing the merged store data 74 to memory would be equivalent to writing the first store data 70 followed by writing the second store data 72, but with fewer memory accesses.

Since merging is based on identifying corresponding positions between individual portions of the store data 70, 72, merging can be performed more effectively when the first store data 70 is held in different data entries of the store buffer 18 (i.e. as described with reference to FIG. 3B or 4B). Then, when the second store data 72 is allocated to the data buffer 18, the portions of the first store data 70 can be overwritten as necessary to generate the merged store data 74. Accordingly, the merging circuitry 60 is configured to generate an overriding signal to the allocation circuitry 14 in order to disable the compression techniques described with reference to FIG. 3C or 4C above, in favour of the improved performance of performing store buffer merging.

Figure 8:
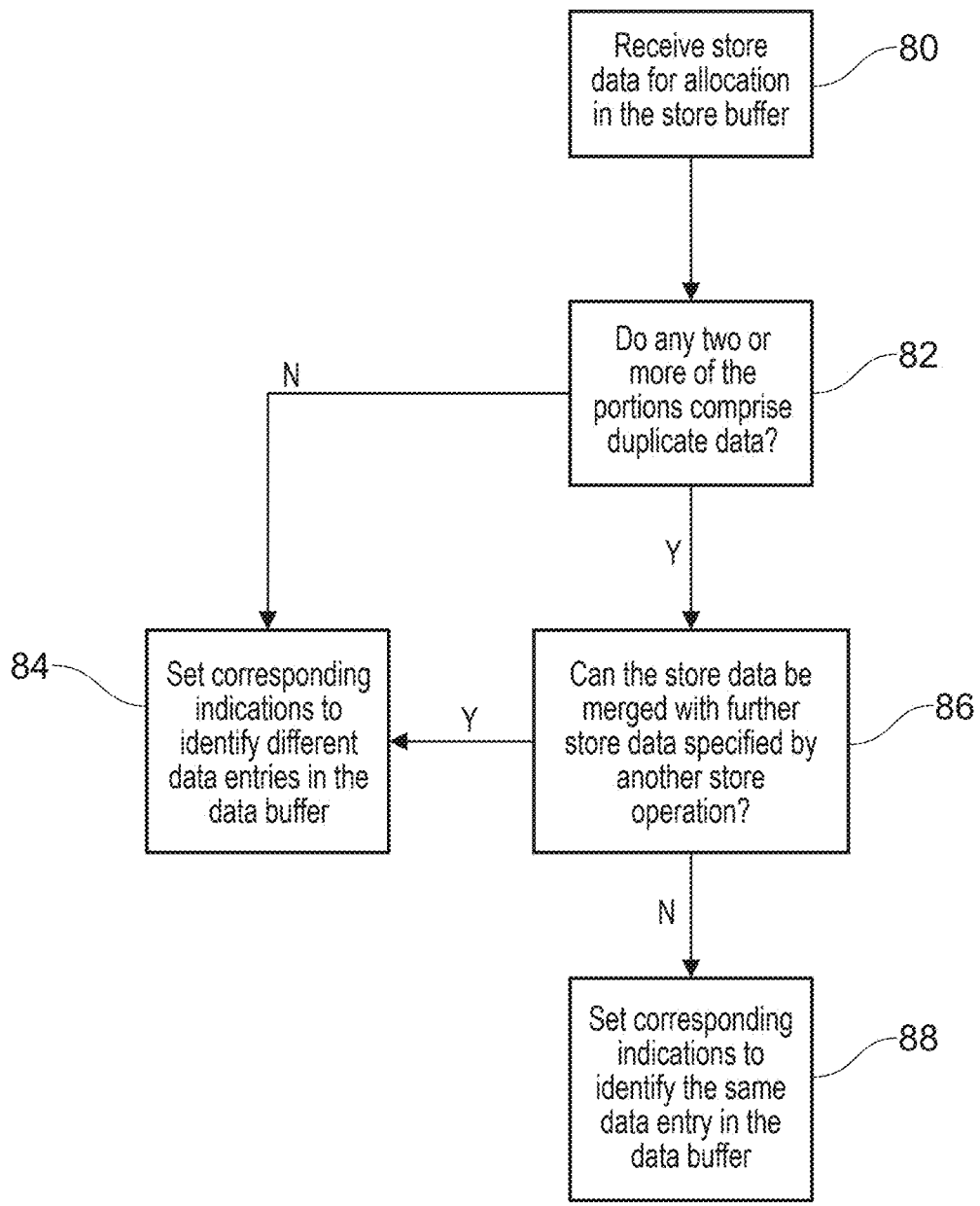
FIG. 8 shows a sequence of steps for determining how to set the indications associated with a given address entry in response to fusible data.

FIG. 8 illustrates a sequence of steps that may be performed by allocation circuitry 14 and the merging circuitry 60. At step 80, store data is received for allocation in the store buffer. At step 82, it is determined whether any two or more of the portions comprise duplicate data, for example using the comparison circuitry 22 or the determination circuitry 24 described above. If each portion of the store data contains unique data (i.e. no duplicate data), then at step 84, the allocation circuitry 14 sets the corresponding indications to indicate different data entries in the data buffer 18. However, if there are portions of the store data containing duplicate data, the merging circuitry 60 determines whether the store data can be merged with further store data specified by another store operation at step 86. For example, the merging circuitry 60 may monitor a queue of operations to be performed by the processing circuitry 4 to identify any store operations directed to the same memory address as the store data received in step 80. If so, then it is preferable to hold the portions is individual data entries in the data buffer 18 to enable store buffer merging. Accordingly, at step 84, the allocation circuitry sets the corresponding indications as though the portions had not contained duplicate data. If the store data cannot be merged with further store data specified by another store operation, then at step 88, the corresponding indications are set to identify the same data entry in the data buffer 18. Accordingly, the store data can be represented using fewer entries in the data buffer 18 as described in previous examples.

Returning to FIG. 6, the load/store unit may also comprise forwarding circuitry 62 so as to support store-to-load forwarding. In particular, if a load operation is received while store data directed to the same memory address is held in the store buffer 16, the load/store unit 12 may reconstruct the store data from the store buffer to be returned as a response to the load operation. Accordingly, the most up-to-date data is provided for the load operation faster than it would have been to re-fetch the data from memory after having been written. The forwarding circuitry 62 is therefore configured to reconstruct the store data that had been apportioned over one or more data entries in the data buffer 18. If any portions had been represented by one data entry in the data buffer 18 in accordance with the present techniques, the forwarding circuitry 62 replicates those portions M times in order to reconstruct the original store data.

Figure 9:
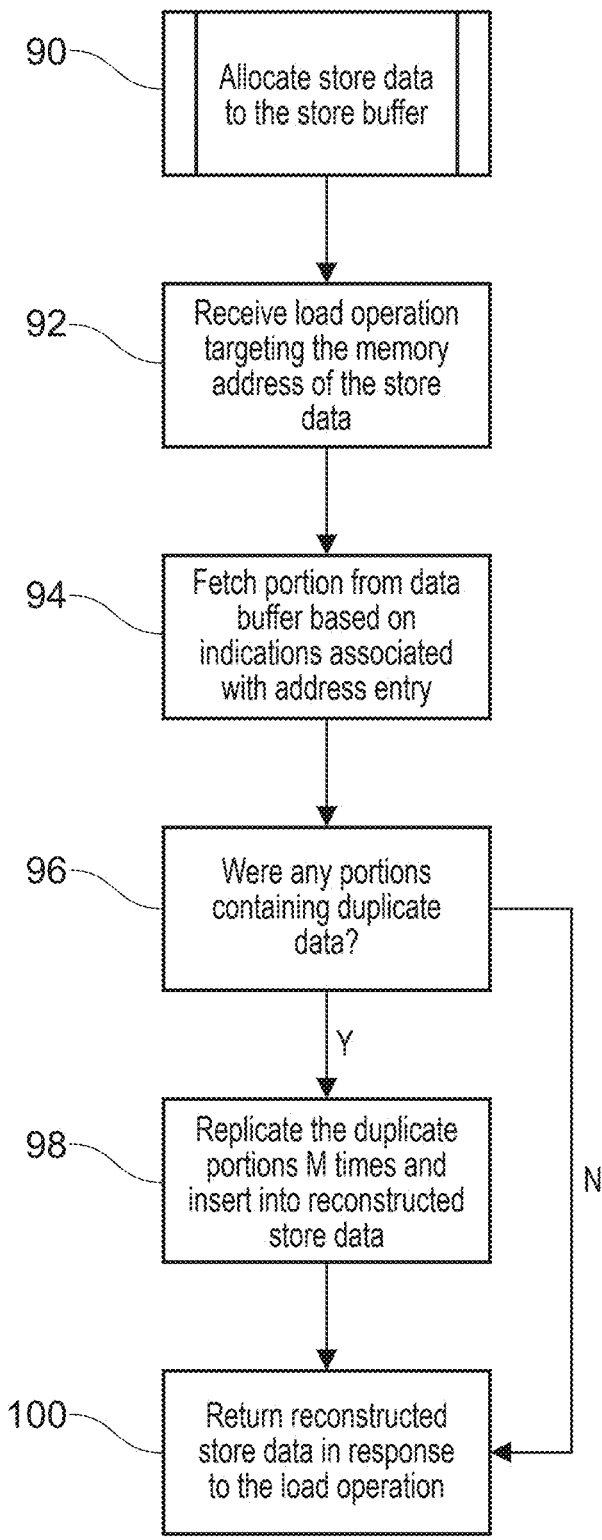
FIG. 9 shows a sequence of steps for performing store-to-load forwarding.

FIG. 9 shows a sequence of steps that may be performed by allocation circuitry 14 and the forwarding circuitry 62. At step 90, the allocation circuitry 16 allocates the store buffer to the store buffer 16 as described in previous examples. At step 92, a load operation is received that targets the same memory address of the store data while the store data is still in the store buffer 16 (i.e. the store data has not yet been written to memory). The forwarding circuitry 62 fetches the portions of the store data from the data buffer based on the indications associated with the address entry. For example, the forwarding circuitry 62 may perform a lookup in the address buffer 20 based on the memory address specified by the load operation. If there is a hit, then the forwarding circuitry 62 can locate the corresponding data entries using the associated indications (i.e. the data pointers of FIG. 6). At step 96, the forwarding circuitry 62 identifies whether any of the portions contained duplicate data by detecting that M indications identified the same data entry in the data buffer 18. If so, then at step 98, the forwarding circuitry 62 replicates the duplicate portion M times to reconstruct the original store before returning the reconstructed store data, for example to the processing circuitry 4, as a response to the load operation in step 100. If there were no portions of the store data containing duplicate data at step 96, then the replication of step 98 is not required and the reconstructed data can be immediately returned as a response to the load operation in step 100.

Figure 10:
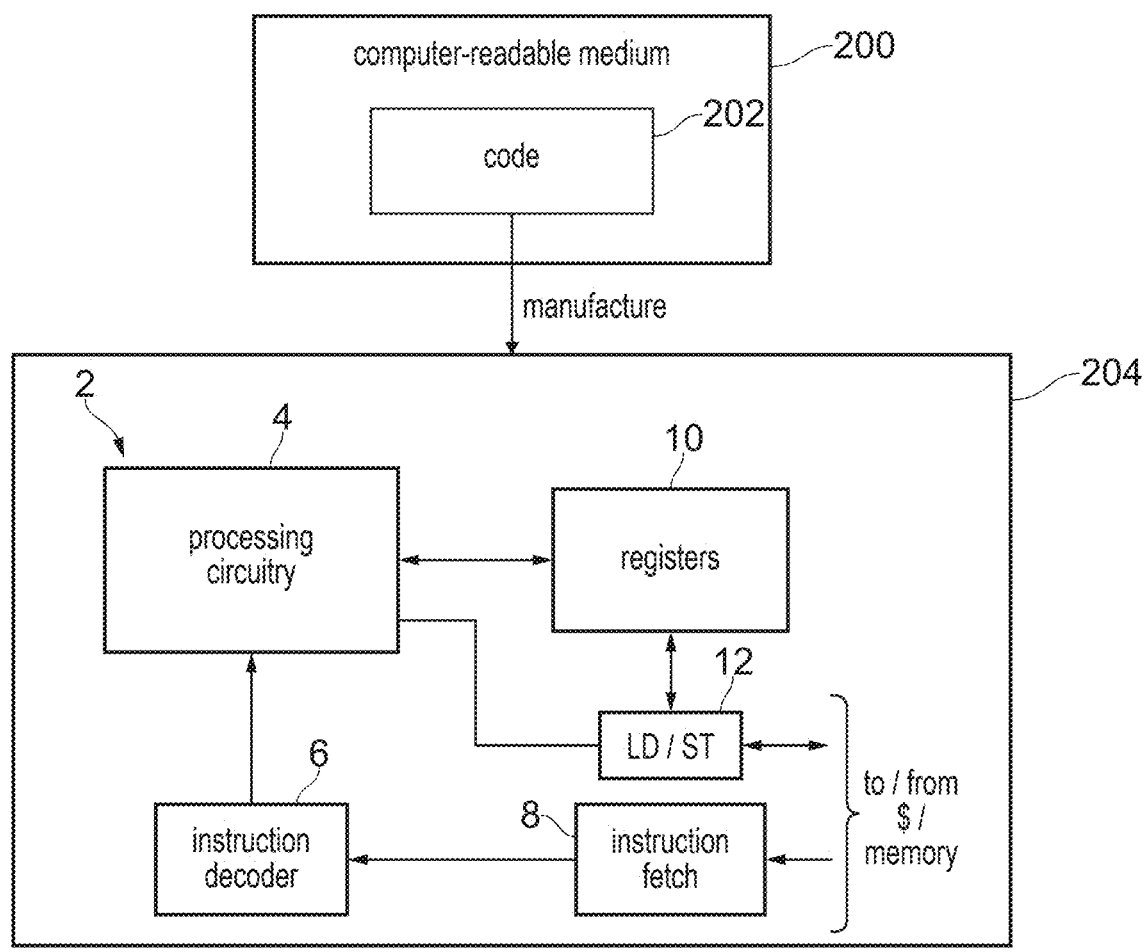
FIG. 10 schematically illustrates the use of a computer-readable medium for manufacturing an apparatus according to some example embodiments.

FIG. 10 illustrates an example of concepts described herein embodied in computer-readable code 202 for fabrication of an apparatus 204 that embodies the described concepts. For example, the computer-readable code 202 can be used at one or more stages of a semiconductor design and fabrication process, including an electronic design automation (EDA) stage, to fabricate an integrated circuit comprising the apparatus 204 embodying the concepts. The above computer-readable code may additionally or alternatively enable the definition, modelling, simulation, verification and/or testing of an apparatus 204 embodying the concepts described herein.

For example, the computer-readable code 202 for fabrication of an apparatus 204 embodying the concepts described herein can be embodied in code defining a hardware description language (HDL) representation of the concepts. For example, the code 202 may define a register-transfer-level (RTL) abstraction of one or more logic circuits for defining an apparatus 204 embodying the concepts. The code 202 may define a HDL representation of the one or more logic circuits embodying the apparatus 204 in Verilog, System Verilog, Chisel, or VHDL (Very High-Speed Integrated Circuit Hardware Description Language) as well as intermediate representations such as FIRRTL. Computer-readable code 202 may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code 202 may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code 202 a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code 202 may comprise a mix of code representations for fabrication of an apparatus 204 (or indeed just any component of the apparatus 204), for example including a mix of one or more of an RTL representation, a netlist representation, or another computer-readable definition to be used in a semiconductor design and fabrication process to fabricate an apparatus 204 embodying the invention. Alternatively or additionally, the concept may be defined in a combination of a computer-readable definition to be used in a semiconductor design and fabrication process to fabricate an apparatus 204 and computer-readable code 202 defining instructions which are to be executed by the defined apparatus once fabricated.

Such computer-readable code can be disposed in any known transitory computer-readable medium 200 (such as wired or wireless transmission of code over a network) or non-transitory computer-readable medium 200 such as semiconductor, magnetic disk, or optical disc. An integrated circuit fabricated using the computer-readable code 202 may comprise components such as one or more of a central processing unit, graphics processing unit, neural processing unit, digital signal processor or other components that individually or collectively embody the concept.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 11:
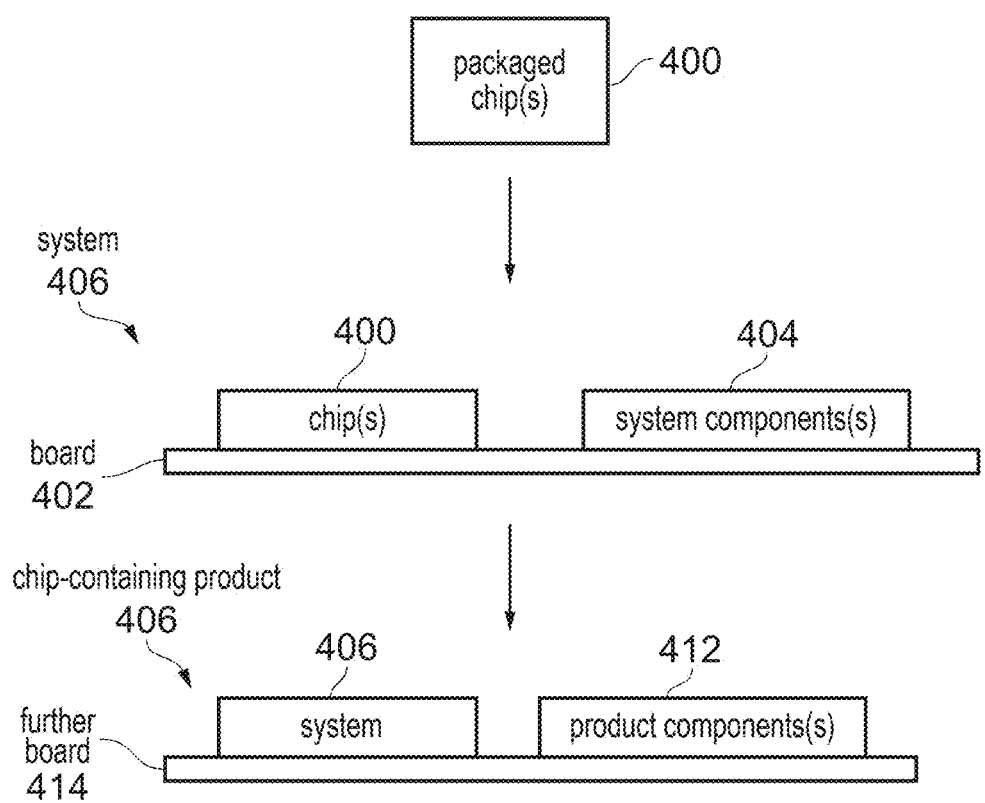
FIG. 11 schematically illustrates a system and a chip-containing product according to some example embodiments.

As shown in FIG. 11, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Some examples of the present invention are set out in the following clauses:

(1) An apparatus comprising:
  allocation circuitry configured to allocate store data in a store buffer, the store data comprising N portions, where N>1;
  the store buffer comprising:
    a data buffer configured to hold data entries, each data entry configured to hold one of the N portions of the store data;
    an address buffer configured to hold address entries, wherein a given address entry is indicative of a memory address at which the store data is to be stored and is associated with N indications identifying one or more of the data entries that contain the store data;

wherein the allocation circuitry is responsive to a determination that M portions of the N portions of the store data each comprise duplicate data to set M indications of the N indications to identify a given data entry holding the duplicate data.

(2) The apparatus of clause (1), wherein in response to the determination that the M portions comprise the duplicate data, the allocation circuitry is configured to prevent a data entry other than the given data entry from holding the duplicate data.

(3) The apparatus of clause (1) or clause (2), comprising determination circuitry configured to determine that the M portions each comprise the duplicate data in response to detecting that the store data is specified by a predetermined type of data processing instruction.

(4) The apparatus of clause (3), wherein the predetermined type of instruction is a memory-set instruction.

(5) The apparatus of any preceding clause, comprising comparison circuitry configured to compare two or more of the N portions prior to allocation and to identify whether the M portions contain the duplicate data.

(6) The apparatus of any preceding clause, wherein each of the N portions correspond to a fixed amount of a cache line to be stored in a data cache.

(7) The apparatus of clause (6), wherein each of the N portions correspond to 1/N of the cache line.

(8) The apparatus of any preceding clause, comprising merging circuitry configured to identify whether the M portions can be merged with further store data; and in response to identifying that the M portions can be merged with the further store data, the merging circuitry is configured to cause the allocation circuitry to set the M indications to identify different data entries, each storing one of the M portions.

(9) The apparatus of clause (8), wherein a further address entry is indicative of a memory address at which the further store data is to be stored; and the merging circuitry is configured to identify that the M portions can be merged with further store data in response to the given address entry and the further address entry being indicative of a same memory address.

(10) The apparatus of any preceding clause, comprising forwarding circuitry configured to, in response to a load operation specifying the memory address, to retrieve the N portions of store data based on the N indications and to replicate the M portions to reconstruct the store data.

(11) The apparatus of any preceding clause, wherein M>1.

(12) A system comprising:

the apparatus of any preceding clause, implemented in at least one packaged chip;

at least one system component;

and a board, wherein the at least one packaged chip and the at least one system component are assembled on the board.

(13) A chip-containing product comprising the system of clause (12), wherein the system is assembled on a further board with at least one other product component.

(14) A method comprising:

allocating store data in a store buffer, the store data comprising N portions, where N>1;

holding data entries, each data entry configured to hold one of the N portions of the store data;

holding address entries, wherein a given address entry is indicative of a memory address at which the store data is to be stored and is associated with N indications identifying one or more of the data entries that contain the store data;

setting, in response to a determination that M portions of the N portions of the store data each comprise duplicate data, M indications of the N indications to identify a given data entry holding the duplicate data.

(15) A non-transitory computer-readable medium storing computer-readable code for fabrication of an apparatus comprising:

allocation circuitry configured to allocate store data in a store buffer, the store data comprising N portions, where N>1;

the store buffer comprising:

a data buffer configured to hold data entries, each data entry configured to hold one of the N portions of the store data;

an address buffer configured to hold address entries, wherein a given address entry is indicative of a memory address at which the store data is to be stored and is associated with N indications identifying one or more of the data entries that contain the store data;

wherein the allocation circuitry is responsive to a determination that M portions of the N portions of the store data each comprise duplicate data to set M indications of the N indications to identify a given data entry holding the duplicate data.

In brief overall summary, apparatuses, systems, methods, computer-readable media, and computer code are disclosed. An apparatus comprises allocation circuitry configured to allocate store data comprising N portions in a store buffer. The store buffer comprises a data buffer configured to hold data entries, each data entry configured to hold one of the N portions of the store data; and an address buffer configured to hold address entries, wherein a given address entry is indicative of a memory address at which the store data is to be stored and is associated with N indications identifying one or more of the data entries that contain the store data. The allocation circuitry is responsive to a determination that M portions of the N portions of the store data each comprise duplicate data to set M indications of the N indications to identify a given data entry holding the duplicate data.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. An apparatus comprising:
allocation circuitry configured to allocate store data in a store buffer, the store data comprising N portions, where N>1;
the store buffer comprising:
   a data buffer configured to hold data entries, each data entry configured to hold one of the N portions of the store data;
   an address buffer configured to hold address entries, wherein a given address entry is indicative of a memory address at which the store data is to be stored and is associated with N indications identifying one or more of the data entries that contain the store data;
wherein the allocation circuitry is responsive to a determination that M portions of the N portions of the store data each comprise duplicate data to set M indications of the N indications to identify a given data entry holding the duplicate data.

2. The apparatus of claim 1, wherein in response to the determination that the M portions comprise the duplicate data, the allocation circuitry is configured to prevent a data entry other than the given data entry from holding the duplicate data.

3. The apparatus of claim 1, comprising determination circuitry configured to determine that the M portions each comprise the duplicate data in response to detecting that the store data is specified by a predetermined type of data processing instruction.

4. The apparatus of claim 3, wherein the predetermined type of instruction is a memory-set instruction.

5. The apparatus of claim 1, comprising comparison circuitry configured to compare two or more of the N portions prior to allocation and to identify whether the M portions contain the duplicate data.

6. The apparatus of claim 1, wherein each of the N portions correspond to a fixed amount of a cache line to be stored in a data cache.

7. The apparatus of claim 6, wherein each of the N portions correspond to 1/N of the cache line.

8. The apparatus of claim 1, comprising merging circuitry configured to identify whether the M portions can be merged with further store data; and
   in response to identifying that the M portions can be merged with the further store data, the merging circuitry is configured to cause the allocation circuitry to set the M indications to identify different data entries, each storing one of the M portions.

9. The apparatus of claim 8, wherein a further address entry is indicative of a memory address at which the further store data is to be stored; and
   the merging circuitry is configured to identify that the M portions can be merged with further store data in response to the given address entry and the further address entry being indicative of a same memory address.

10. The apparatus of claim 1, comprising forwarding circuitry configured to, in response to a load operation specifying the memory address, to retrieve the N portions of store data based on the N indications and to replicate the M portions to reconstruct the store data.

11. The apparatus of claim 1, wherein M>1.

12. A system comprising:
the apparatus of claim 1, implemented in at least one packaged chip;
at least one system component;
and a board,
wherein the at least one packaged chip and the at least one system component are assembled on the board.

13. A chip-containing product comprising the system of claim 12, wherein the system is assembled on a further board with at least one other product component.

14. A method comprising:
allocating store data in a store buffer, the store data comprising N portions, where N>1;
holding data entries, each data entry configured to hold one of the N portions of the store data;
holding address entries, wherein a given address entry is indicative of a memory address at which the store data is to be stored and is associated with N indications identifying one or more of the data entries that contain the store data;
setting, in response to a determination that M portions of the N portions of the store data each comprise duplicate data, M indications of the N indications to identify a given data entry holding the duplicate data.

15. A non-transitory computer-readable medium storing computer-readable code for fabrication of an apparatus comprising:
allocation circuitry configured to allocate store data in a store buffer, the store data comprising N portions, where N>1;
the store buffer comprising:
   a data buffer configured to hold data entries, each data entry configured to hold one of the N portions of the store data;
   an address buffer configured to hold address entries, wherein a given address entry is indicative of a memory address at which the store data is to be stored and is associated with N indications identifying one or more of the data entries that contain the store data;
wherein the allocation circuitry is responsive to a determination that M portions of the N portions of the store data each comprise duplicate data to set M indications of the N indications to identify a given data entry holding the duplicate data.

* * * * *